US010560287B2

(12) United States Patent
Petersson et al.

(10) Patent No.: US 10,560,287 B2
(45) Date of Patent: Feb. 11, 2020

(54) RELATIVE UPLINK CHANNEL ESTIMATION

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 98 days.

(21) Appl. No.: 15/578,369

(22) PCT Filed: Nov. 8, 2017

(86) PCT No.: PCT/EP2017/078610
§ 371 (c)(1),
(2) Date: Nov. 30, 2017

(87) PCT Pub. No.: WO2019/091552
PCT Pub. Date: May 16, 2019

(65) Prior Publication Data
US 2019/0140865 A1 May 9, 2019

(51) Int. Cl.
*H04L 25/02* (2006.01)
*H04L 5/00* (2006.01)
*H04B 7/0456* (2017.01)
*H04B 7/06* (2006.01)

(52) U.S. Cl.
CPC ....... *H04L 25/0228* (2013.01); *H04B 7/0456* (2013.01); *H04B 7/0626* (2013.01);
(Continued)

(58) Field of Classification Search
CPC .. H04L 25/0228; H04L 5/0048; H04B 7/0456
See application file for complete search history.

(56) References Cited

U.S. PATENT DOCUMENTS

| 2007/0099571 A1* | 5/2007 | Withers, Jr. | ......... H04B 7/0408 455/67.11 |
| 2013/0303157 A1* | 11/2013 | Tao | ......... H04B 7/024 455/423 |

(Continued)

OTHER PUBLICATIONS

Shi et al., An Efficient Method for Enhancing TDD Over the Air Reciprocity Calibration, 2011, IEEE WCNC 2011, pp. 339-344. (Year: 2011).*

(Continued)

*Primary Examiner* — Shailendra Kumar
(74) *Attorney, Agent, or Firm* — Sage Patent Group

(57) ABSTRACT

There is provided mechanisms for relative uplink channel estimation. A method is performed by a terminal device. The method comprises transmitting reference signals from at least two antennas on respective uplink channels towards a network node. The method comprises receiving a forwarded representation of each of the reference signals from the network node. The method comprises estimating a relation between the uplink channels towards the network node for the at least two antennas using the reference signals and the received forwarded representations of the reference signals, thereby estimating the relative uplink channel, towards the network node, between the at least two antennas.

24 Claims, 4 Drawing Sheets

(52) U.S. Cl.
CPC ......... *H04B 7/0634* (2013.01); *H04L 5/0048* (2013.01); *H04L 25/0204* (2013.01)

(56) References Cited

U.S. PATENT DOCUMENTS

2016/0205670 A1* 7/2016 Kakishima ............... H04B 7/04 370/280
2016/0308624 A1* 10/2016 Rong ...................... H04B 7/024

OTHER PUBLICATIONS

Qualcomm Europe, Calibration Procedures for TDD Beamforming, 3GPP TSG RAN1 #51bis, Jan. 14-18, 2008, Seville, Spain; R1-080494 (Year: 2008).*

Withers, Jr. et al., "Echo-MIMO: A Two-Way Channel Training Method for Matched Cooperative Beamforming," IEEE Transactions on Signal Processing, vol. 56, No. 9, 14 pages (Sep. 2008).

Pratt et al., "Polarization-Based Zero Forcing with Channel Estimation," IEEE, The 2016 Military Communications Conference—Track 6—Department of Defense Programs, 6 pages (Nov. 7, 2011).

Shi et al., "An Efficient Method for Enhancing TDD Over the Air Reciprocity Calibration," IEEE 2011 Wireless Communications and Networking Conference, 6 pages (Mar. 28, 2011).

International Search Report and Written Opinion of the International Searching Authority for International Application No. PCT/EP2017/078610 dated Jul. 30, 2018, 16 pages.

Report of Novelty Search by Kransell Wennborg for Invention Disclosure P71468 dated Sep. 13, 2017, 4 pages.

* cited by examiner

RELATIVE UPLINK CHANNEL ESTIMATION

CROSS REFERENCE TO RELATED APPLICATION

This application is a 35 U.S.C. § 371 national stage application of PCT International Application No. PCT/EP2017/078610 filed on Nov. 8, 2017, the disclosure and content of which is incorporated herein by reference in its entirety.

TECHNICAL FIELD

Embodiments presented herein relate to a method, a terminal device, a computer program, and a computer program product for relative uplink channel estimation.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for users (e.g. wireless terminal devices, or terminal devices for short) and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network-side (e.g. at transmission points or access nodes) and at the user-side might be required to reach a sufficient link budget.

At the transmission points hundreds of antennas elements are expected to be used for beamforming in order to counteract poor radio channel propagation properties.

In the document "Echo-MIMO: A Two-Way Channel Training Method for Matched Cooperative Beamforming", by Lang P. Withers, Jr., in IEEE Transactions on Signal Processing, Vol. 56, No. 9, September 2008, there is a description of full loop precoding for a terminal device. The purpose of the precoding scheme is to attain channel state information (CSI) in the uplink from the terminal device when the terminal device is not calibrated between transmission and reception. The CSI can then be used at the terminal device for uplink precoding. The uplink estimation for the precoder described in this document is based on estimations of both round-trip channels and downlink channels. The uplink channel, which is used for determining the uplink precoder, is then estimated from the round-trip channels and downlink channels.

One issue with the above-described method is the amount of signalling needed in order for the terminal device to be able to determine the uplink precoder.

Hence, there is still a need for mechanisms enabling more efficient determination of the uplink precoder.

SUMMARY

An object of embodiments herein is to provide efficient uplink channel estimation that does not need as much signalling as conventional uplink channel estimation, and that is suitable for, for example, uplink precoder determination.

According to a first aspect there is presented a method for relative uplink channel estimation. The method is performed by a terminal device. The method comprises transmitting reference signals from at least two antennas on respective uplink channels towards a network node. The method comprises receiving a forwarded representation of each of the reference signals from the network node. The method comprises estimating a relation between the uplink channels towards the network node for the at least two antennas using the reference signals and the received forwarded representations of the reference signals, thereby estimating the relative uplink channel, towards the network node, between the at least two antennas.

According to a second aspect there is presented a terminal device for relative uplink channel estimation. The terminal device comprises processing circuitry. The processing circuitry is configured to cause the terminal device to transmit reference signals from at least two antennas on respective uplink channels towards a network node. The processing circuitry is configured to cause the terminal device to receive a forwarded representation of each of the reference signals from the network node. The processing circuitry is configured to cause the terminal device to estimate a relation between the uplink channels towards the network node for the at least two antennas using the reference signals and the received forwarded representations of the reference signals, thereby estimating the relative uplink channel, towards the network node, between the at least two antennas.

According to a third aspect there is presented a terminal device for relative uplink channel estimation. The terminal device comprises a transmit module configured to transmit reference signals from at least two antennas on respective uplink channels towards a network node. The terminal device comprises a receive module configured to receive a forwarded representation of each of the reference signals from the network node. The terminal device comprises an estimate module configured to estimate a relation between the uplink channels towards the network node for the at least two antennas using the reference signals and the received forwarded representations of the reference signals, thereby estimating the relative uplink channel, towards the network node, between the at least two antennas.

Advantageously this method and these terminal devices provide efficient uplink channel estimation.

Advantageously this method and these terminal devices do not need as much signalling for estimating the uplink channel compared to conventional methods for estimating the uplink channel.

Advantageously the estimation of the uplink channel estimation is suitable to be combined with uplink precoder determination.

Advantageously this method and these terminal devices enable the uplink precoder to be determined using only an estimate of the round-trip channels, thus without any estimation of the downlink channel, which will save overhead signaling.

According to a fourth aspect there is presented a computer program for relative uplink channel estimation, the computer program comprising computer program code which, when run on a terminal device, causes the terminal device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1:
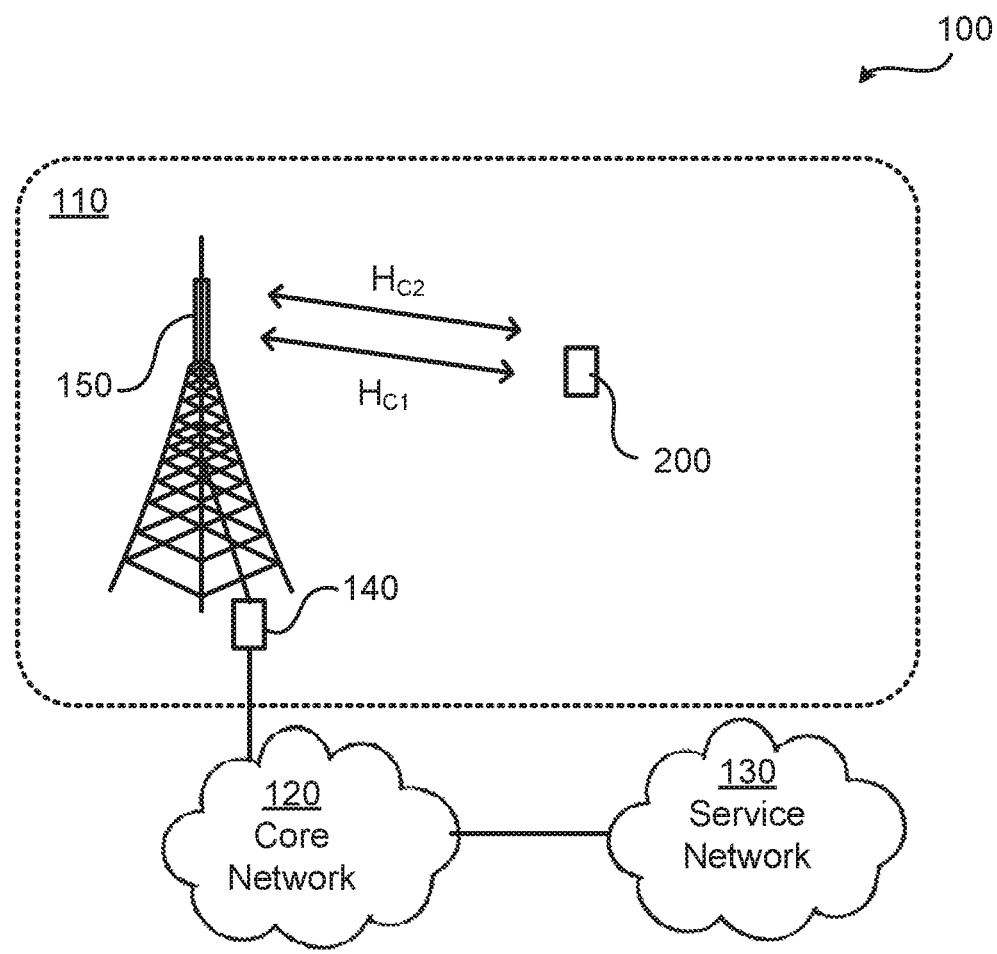
FIG. 1 is a schematic diagram illustrating a communications system according to embodiments.

FIG. 1 is a schematic diagram illustrating a communications system 100 where embodiments presented herein can be applied. The communications system 100 could be a third generation (3G) telecommunications system, a fourth generation (4G) telecommunications system, or a fifth (5G) telecommunications system and support any 3GPP telecommunications standard.

The communications system 100 comprises a network node 140 configured to provide network access to a terminal device 200 in a radio access network 110. $H_{C_1}$ and $H_{C_2}$ denote examples of radio propagation channels between the terminal device 200 and the network node 140.

The network node 140 provides network access in the radio access network 110 by transmitting signals to, and receiving signals from, the terminal device 200. The signals could be transmitted from, and received from a radio interface 150 (such as a transmission and reception point, TRP) at the network node 140. The radio interface 150 could form an integral part of the network node 140 or be physically separated from the network node 140.

The network node 140 is operatively connected to a core network 120. The core network 120 is in turn operatively connected to a service network 130, such as the Internet. The terminal device 200 is thereby, via the and the network node 140, enabled to access services of, and exchange data with, the service network 130.

Examples of network nodes 140 are radio access network nodes, radio base stations, base transceiver stations, Node Bs, evolved Node Bs, g Node Bs, access points, and access nodes. Examples of terminal devices 200 are wireless devices, mobile stations, mobile phones, handsets, wireless local loop phones, user equipment (UE), smartphones, laptop computers, tablet computers, network equipped sensors, network equipped vehicles, and so-called Internet of Things devices.

As noted above, conventional methods for enabling the terminal device 200 to determine the uplink precoder requires significant signalling. An object of embodiments herein is to provide efficient uplink channel estimation that does not need as much signalling as conventional uplink channel estimation, and that is suitable for, for example, uplink precoder determination. The embodiments disclosed herein therefore relate to mechanisms for relative uplink channel estimation. In order to obtain such mechanisms there is provided a terminal device 200, a method performed by the terminal device 200, a computer program product comprising code, for example in the form of a computer program, that when run on a terminal device 200, causes the terminal device 200 to perform the method.

Figure 2:
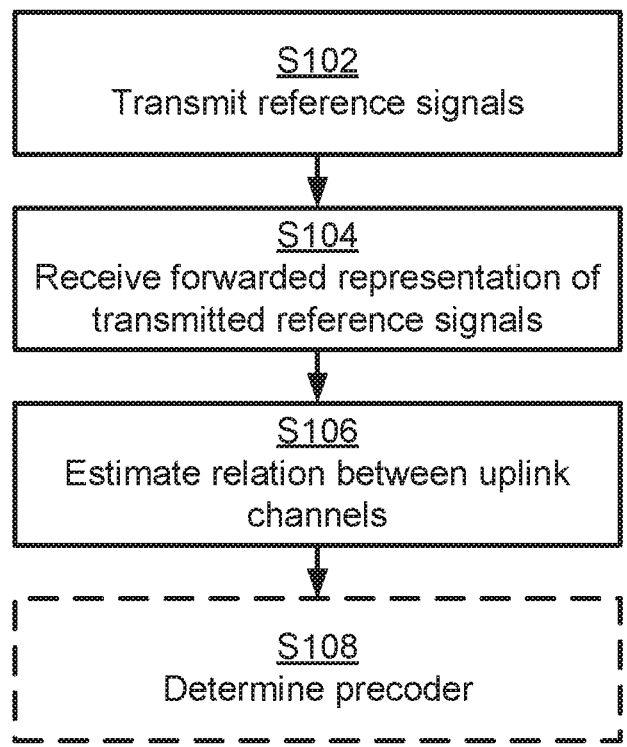
FIG. 2 is a flowchart of methods according to embodiments.

FIG. 2 is a flowchart illustrating embodiments of methods for relative uplink channel estimation. The methods are performed by the terminal device 200. The methods are advantageously provided as computer programs 320.

It is assumed that the terminal device 200 transmits reference signals that are intended to be received by the network node 140. The reference signals are transmitted from each of at least two antennas T1, T2. Particularly, the terminal device 200 is configured to perform step S102:

S102: The terminal device 200 transmits reference signals from at least two antennas T1, T2 on respective uplink channels towards a network node 140.

It is assumed that the reference signals are received by the network node 140 and that the network node 140 responds to the terminal device 200 by transmitting a representation of each of the reference signals back towards the terminal device 200. Particularly, the terminal device 200 is configured to perform step S104:

S104: The terminal device 200 receives a forwarded representation of each of the reference signals from the network node 140.

The terminal device 200 then estimates the round-trip channel from each of the transmit branches to at least one receive branch by utilizing the knowledge about the transmitted reference signals, and without any explicit knowledge of the downlink channel. Particularly, the terminal device 200 is configured to perform step S106:

S106: The terminal device 200 estimates a relation between the uplink channels towards the network node 140 for the at least two antennas T1, T2. The relation is estimated using the reference signals and the received forwarded representations of the reference signals. The terminal device 200 thereby estimates the relative uplink channel, towards the network node 140, between the at least two antennas T1, T2.

Embodiments relating to further details of relative uplink channel estimation as performed by the terminal device 200 will now be disclosed.

In some aspects the terminal device 200 estimates the round-trip channel from each of the at least two transmit branches Tx1, Tx2 to at least one receive branch Rx2. Particularly, according to an embodiment the reference signals are transmitted using one transmit branch Tx1, Tx2 per antenna T1, T2 of the at least two antennas T1, T2 such that the reference signals are transmitted using as many transmit branches Tx1, Tx2 as there are antennas T1, T2. The forwarded representations of the reference signals are received on at least one receive branch Rx1, Rx2.

In some aspects the same antennas are used for transmission and reception. The same antennas then represent both transmit antennas and reception antennas. Particularly, according to an embodiment the at least two antennas used for transmission also are used as the reception antennas. However, in other aspects the reception antennas are separated from the transmission antennas. Particularly, according to an embodiment the reception antennas are separated from the at least two antennas T1, T2 used for transmission.

Figure 3:
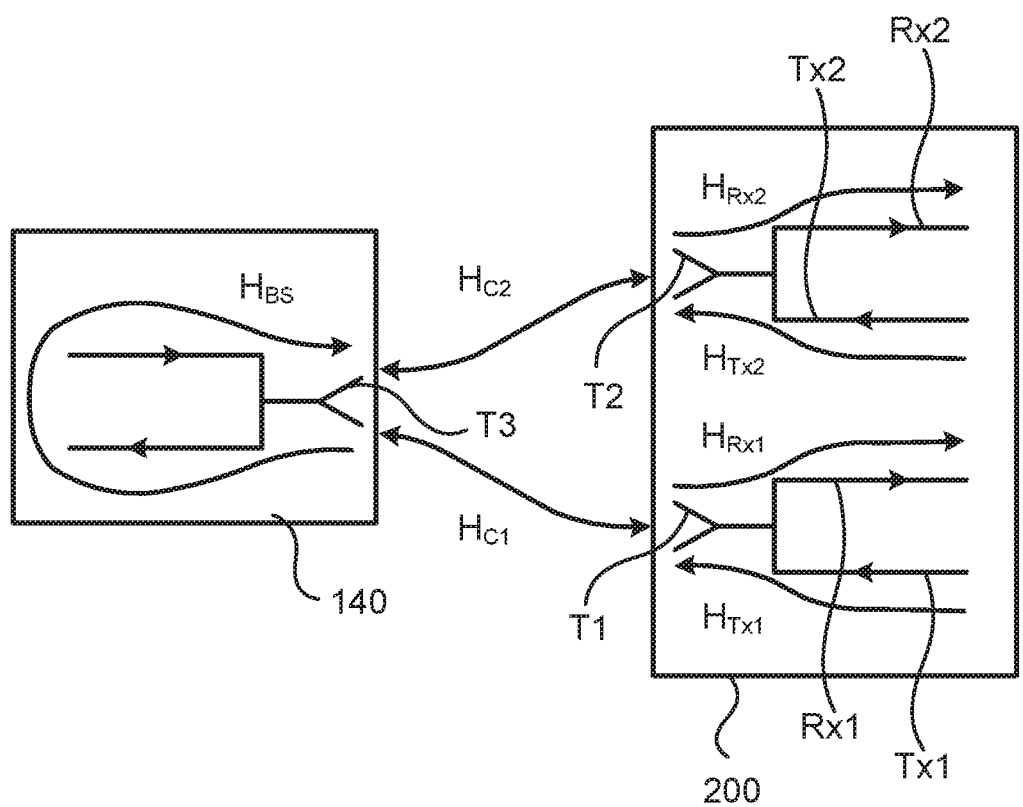
FIG. 3 schematically illustrates channels between a terminal device and a network node according to an embodiment.

Parallel reference is now made to FIG. 3. FIG. 3 schematically illustrates a network node 140 and a terminal device 200 and the radio propagation channels there between as well as the internal propagation channels in the network node 140 and in the terminal device 200. In some aspects the antenna T3 of the network node 140 is part of the radio interface 150. Additional notation of the channels as provided in FIG. 3 will be defined in the following. It is noted that although the network node 140 in the example of FIG. 3 comprises only one single antenna T3, the herein disclosed embodiments are not limited to a network node 140 having any particular number of antennas; the network node 140 might have any number of physical or virtual antennas. The skilled person would understand how to extend the notation, as well as the inventive concept, as provided herein to scenarios where the network node 140 comprises two or more antennas, for example by adding additional channels between the network node 140 and the terminal device 200; two for each antenna added at the network node 140.

With the example in FIG. 3, the CSI needed at the terminal device 200 to determine the uplink precoder (hereinafter just denoted precoder for short) is defined by the uplink channel vector:

$$H = [H_{UL1} \quad H_{UL2}] = H_{UL1}\left[1 \quad \frac{H_{UL2}}{H_{UL1}}\right]$$

Since a scalar multiplication has no impact on the spatial characteristics of the channel, it is sufficient for the terminal device 200 to estimate the relative channel $$H_{UL,rel} = \frac{H_{UL2}}{H_{UL1}}.$$

That is, the individual channel coefficients $H_{UL1}$ and $H_{UL2}$ are not needed as long as the relative uplink channel $H_{UL,rel}$ can be estimated. The relative uplink channel $H_{UL,rel}$ is obtained by dividing the estimated round trip channels from the two transmit branches. Particularly, according to an embodiment the relation between the uplink channels for a given one of the at least one receive branch Rx1, Rx2 is determined as a relation between the forwarded representations of the reference signals as received on this given receive branch Rx1, Rx2.

In mathematical terms, a first estimate of the relative uplink channel follows from the expressions:

$$H_{e1} = H_{Tx1}H_{C1}H_{BS}H_{C2}H_{Rx2}$$

$$H_{e2} = H_{Tx2}H_{C2}H_{BS}H_{C2}H_{Rx2}$$

Here, $H_{e1}$ and $H_{e2}$ are the round-trip channels transmitted using respective transmit branches Tx1 and Tx2 and received by the terminal device 200 using receive branch Rx2. Further, $H_{Tx1}$ and $H_{Tx2}$ are the channels for the transmit branches of each respective antenna. Further, $H_{Rx1}$ and $H_{Rx2}$ are the channels for the receiver branches of each respective antenna. Further, $H_{C1}$ is the channel between antenna T1 and the antenna at the network node 140. Further, $H_{BS}$ is the combined channel for the transmit branch and receive branch of the network node 140. Further, $H_{C2}$ is the channel between antenna T2 and the and the antenna at the network node 140. Dividing the above two expressions for $H_{e1}$ and $H_{e2}$ yields:

$$H_{e2}/H_{e1} = H_{Tx2}H_{C2}/(H_{Tx1}H_{C1})$$

Since the only interest is in relative channels, it can, without losing generality, assume that the transmit channel, $H_{UL1}$, for transmit branch Tx1 be:

$$H_{UL1} = H_{Tx1}H_{C1} = 1$$

From this expression for $H_{UL1}$ it follows that the transmit channel, $H_{UL2}$, for transmit branch number Tx2 becomes:

$$H_{UL2} = H_{Tx2}H_{C2} = H_{e2}/H_{e1}$$

From this information (i.e. from the estimation of $H_{UL2}$ and assuming $H_{UL1}=1$) the terminal device 200 is able to determine coefficients of a precoder.

In some aspects, the terminal device 200 thus uses the knowledge of the relative uplink channel when determining a precoder. Particularly, according to an embodiment the terminal device 200 is configured to perform (optional) step S108:

S108: The terminal device 200 determines a precoder for the relative uplink channel.

There could be different ways for the terminal device 200 to determine the precoder. In general terms, the precoder is based on the relative uplink channel. Particularly, according to an embodiment, coefficients w of the precoder are determined as $w = H^*_{UL,rel}$, where $H^*_{UL,rel}$ denotes conjugate transpose of $H_{UL,rel}$, and where $H_{UL,rel}$ represents channel coefficients of the relative uplink channel.

In some aspects both receive branches Rx1, Rx2 are active when the uplink channel is returned on downlink (i.e., when the forwarded representation of each of the reference signals is received in step S104). Particularly, according to an embodiment the forwarded representations of the reference signals are received at one receive branch Rx1, Rx2 per reception antenna such that the forwarded representations of the reference signals are received using as many receive branches Rx1, Rx2 as there are reception antennas.

Then, in addition to the above expression for $H_{e1}$ and $H_{e2}$, similar expression can be obtained for estimates of the round-trip channels transmitted using respective transmit branches Tx1 and Tx2 and received by the terminal device 200 using receive branch Rx1:

$$H_{e3} = H_{Tx1} H_{C1} H_{BS} H_{C1} H_{Rx1}$$

$$H_{e4} = H_{Tx2} H_{C2} H_{BS} H_{C1} H_{Rx1}$$

In these expressions, $H_{e3}$ and $H_{e4}$ are the full loop channels transmitted from respective transmit branches Tx1 and Tx2 and received by the terminal device 200 using receive branch Rx1. Similarly, to what is previously described another estimate of the channels relation $H_{UL2}$ can be expressed as:

$$H_{UL2} = H_{Tx2} H_{C2} = H_{e4}/H_{e3}$$

The two estimates of $H_{UL2}$ might be combined in some sense to obtain a combined estimate with better accuracy than the individual estimates of $H_{UL2}$. Particularly, according to an embodiment one respective individual relation between the uplink channels is estimated for each of the receive branches Rx1, Rx2. The respective individual relations are then combined into one common relation. The common relation defines the relation between the uplink channels.

In some aspects the Signal to Interference plus Noise Ratio (SINR) is taken into account when combining the two estimates of $H_{UL2}$. Particularly, according to an embodiment the respective individual relations are weighted according to their respective SINR when being combined into the one common relation. In some aspects the combination of the two estimates of $H_{UL2}$ is defined by $\widehat{H_{Tx2}H}_{C2}$, where $\widehat{H_{Tx2}H}_{C2}$ is expressed as follows:

$$\widehat{H_{Tx2}H}_{C2} = z_1(SINR_1)\frac{H_{e2}}{H_{e1}} + z_2(SINR_2)\frac{H_{e4}}{H_{e3}}$$

Here $SINR_1$ and $SINR_2$ are the estimates of the SINR per estimate k and $z_k$ denotes a weight for estimate k. One example of such weights $z_k$ is the square root of $SINR_k$. That is:

$$z_k(SINR_k) = \sqrt{SINR_k}$$

There could be different examples of reference signals that the terminal device 200 transmits in step S102. Particularly, according to an embodiment the reference signals are Sounding Reference Signals (SRS).

There could be different examples of forwarded representations of the reference signals that the terminal device 200 receives in step S204.

In some aspects the network node 140 receives the reference signals and then amplifies and forwards the reference signals back to the terminal device 200. Particularly, according to an embodiment the forwarded representations of the reference signals are the transmitted reference signals as amplified and forwarded by the network node 140.

In some aspects the network node 140 receives the reference signals and then transmits a coded estimate of the reference signals back to the terminal device 200. Particularly, according to an embodiment the forwarded representations of the reference signals are the transmitted reference signals as estimated and encoded by the network node 140.

In some aspects the network node 140 receives the reference signals and then normalizes the reference signals before transmitting the thus normalized reference signals back to the terminal device 200. Particularly, according to an embodiment one of the forwarded representations of the reference signals is normalized by the network node 140.

In some aspects the herein disclosed embodiments do not require the transmit branches Tx1, Tx2 and receive branches Rx1, Rx2 to be calibrated. Particularly, according to an embodiment the relative uplink channel is estimated for the at least one receive branch Rx1, Rx2 as being uncorrelated with the transmit branches Tx1, Tx2. The herein disclosed embodiments can thus be used to provide sufficient CSI in the terminal device 200 to determine a precoder when the transmit branches Tx1, Tx2 and receive branches Rx1, Rx2 are not calibrated. When the terminal device 200 is not calibrated, reciprocity cannot be utilized directly to determine the precoder. The herein disclosed embodiments are thus particularly advantageous when it cannot be assumed that the terminal device 200 is calibrated.

Figure 4:
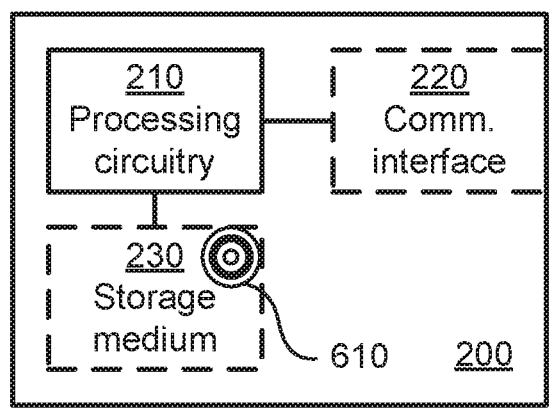
FIG. 4 is a schematic diagram showing functional units of a terminal device according to an embodiment.

FIG. 4 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, S102-S108, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The terminal device 200 may further comprise a communications interface 220 at least configured for communications with communications with other nodes, entities, functions, and devices of the communications network 100, and especially with the network node 140. As such the communications interface 220 may comprise one or more transmitters and receivers, comprising analogue and digital components, such as antennas T1, t2, transmit branches Tx1, Tx2, and one or more receive branches Rx1, Rx2.

The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 5:
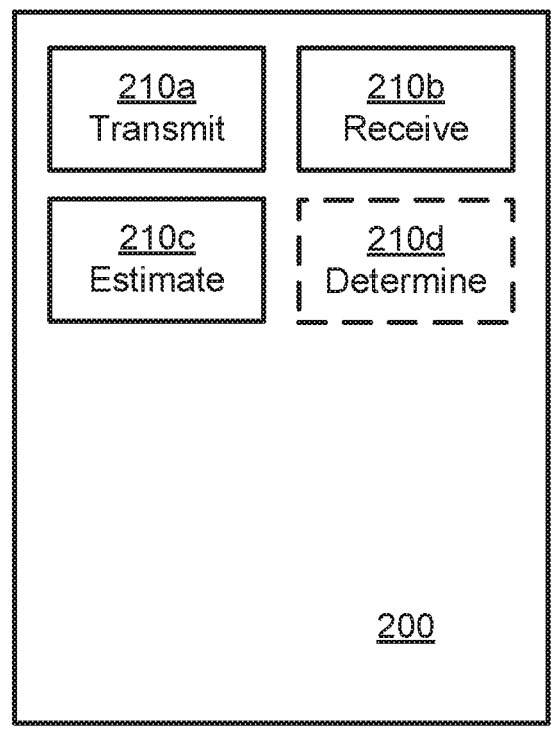
FIG. 5 is a schematic diagram showing functional modules of a terminal device according to an embodiment.

FIG. 5 schematically illustrates, in terms of a number of functional modules, the components of a terminal device 200 according to an embodiment. The terminal device 200 of FIG. 5 comprises a number of functional modules; a transmit module 210a configured to perform step S102, a receive module 210b configured to perform step S104, and an estimate module 210c configured to perform step S106.

The terminal device 200 of FIG. 5 may further comprise a number of optional functional modules, such as a determine module 210d configured to perform step S108. In general terms, each functional module 210a-210d may in one embodiment be implemented only in hardware and in another embodiment with the help of software, i.e., the latter embodiment having computer program instructions stored on the storage medium 230 which when run on the processing circuitry makes the terminal device 200 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The terminal device 200 may be provided as a standalone device or as a part of at least one further device. Thus, a first portion of the instructions performed by the terminal device 200 may be executed in a first device, and a second portion of the of the instructions performed by the terminal device 200 may be executed in a second device; the herein disclosed embodiments are not limited to any particular number of devices on which the instructions performed by the terminal device 200 may be executed. Therefore, although a single processing circuitry 210 is illustrated in FIG. 4 the processing circuitry 210 may be distributed among a plurality of devices, or nodes. The same applies to the functional modules 210a-210d of FIG. 5 and the computer program 320 of FIG. 6 (see below).

Figure 6:
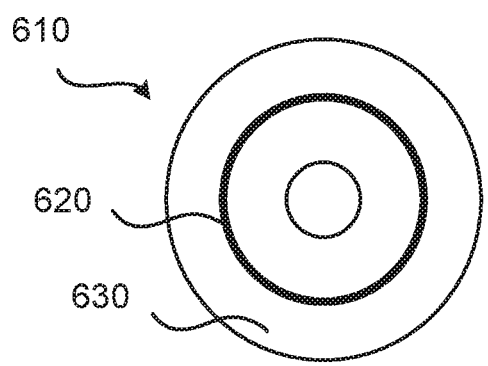
FIG. 6 shows one example of a computer program product comprising computer readable storage medium according to an embodiment.

FIG. 6 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for estimating a relative uplink channel between a terminal device and a network node, the method being performed by the terminal device, the method comprising:
    transmitting reference signals from at least two antennas on respective uplink channels towards a network node;
    receiving a forwarded representation of each of the reference signals from the network node;
    determining estimations of the respective uplink channels towards the network node for the at least two antennas using the reference signals and the received forwarded representations of the reference signals;
    determining a computational relationship between the estimations of the respective uplink channels by dividing between the estimations of the respective uplink channels; and
    estimating the relative uplink channel based on the determined computational relationship, wherein the relative uplink channel represents an uplink radio propagation environment, towards the network node, between the at least two antennas.

2. The method according to claim 1, wherein the reference signals are transmitted using one transmit branch per antenna of the at least two antennas such that the reference signals are transmitted using as many transmit branches as there are antennas, and wherein the forwarded representations of the reference signals are received on at least one receive branch.

3. The method according to claim 2, wherein the computational relationship between estimations of the respective uplink channels for a given one of the at least one receive branch is determined as a computational relationship between the forwarded representations of the reference signals as received on a single receive branch.

4. The method according to claim 2, wherein the forwarded representations of the reference signals are received at one receive branch per reception antenna such that the forwarded representations of the reference signals are received using as many receive branches as there are reception antennas.

5. The method according to claim 4, wherein the at least two antennas used for transmission also are used as the reception antennas.

6. The method according to claim 4, wherein the reception antennas are separated from the at least two antennas used for transmission.

7. The method according to claim 4, wherein one respective individual computational relationship between estimations of the respective uplink channels is estimated for each of the receive branches of the terminal, and wherein the respective computational relationships for each of the receive branches of the terminal are combined into one common computational relationship, the common computational relationship defining the computational relationship between estimations of the respective uplink channels.

8. The method according to claim 7, wherein the respective individual computational relationships are weighted according to their respective Signal to Interference plus Noise Ratio, SINR, when being combined into the one common computational relationship.

9. The method according to claim 2, wherein the relative uplink channel is estimated for the at least one receive branch as being uncorrelated with the transmit branches.

10. The method according to claim 1, further comprising:
determining an uplink precoder for the relative uplink channel.

11. The method according to claim 10, wherein coefficients w of the precoder are determined as $w=H_{UL,rel}^*$, where $H_{UL,rel}^*$ denotes conjugate transpose of $H_{UL,rel}$, and where $H_{UL,rel}$ represents channel coefficients of the relative uplink channel.

12. The method according to claim 1, wherein the reference signals are Sounding Reference Signals, SRS.

13. The method according to claim 1, wherein the forwarded representations of the reference signals are the transmitted reference signals as amplified and forwarded by the network node.

14. The method according to claim 13, wherein one of the forwarded representations of the reference signals is normalized by the network node.

15. The method according to claim 1, wherein the forwarded representations of the reference signals are the transmitted reference signals as estimated and encoded by the network node.

16. The method according to claim 1, further comprising:
determining channel station information (CSI) based on the computational relationship between estimations of the respective uplink channels towards the network node; and
determining an uplink precoder based on the determined CSI.

17. The method according to claim 1, wherein determining the computational relationship between estimations of the respective uplink channels comprises determining the computational relationship between estimations of the respective uplink channels without any explicit knowledge of the downlink channel.

18. The method according to claim 1, the method further comprising:
determining coefficients of an uplink precoder based on a conjugate transpose of the channel coefficients of the estimated relative uplink channel; and
beamforming transmission signals utilizing the determined coefficients of the uplink precoder.

19. A terminal device for estimating a relative uplink channel between a terminal device and a network node, the terminal device comprising processing circuitry, the processing circuitry being configured to cause the terminal device to:
transmit reference signals from at least two antennas on respective uplink channels towards a network node;
receive a forwarded representation of each of the reference signals from the network node;
determine estimations of the respective uplink channels towards the network node for the at least two antennas using the reference signals and the received forwarded representations of the reference signals;
determine a computational relationship between the estimations of the respective uplink channels by dividing between the estimations of the respective uplink channels; and
estimate the relative uplink channel based on the determined computational relationship, wherein the relative uplink channel represents an uplink radio propagation environment, towards the network node, between the at least two antennas.

20. The terminal device according to claim 19, wherein the processing circuitry further is configured to cause the terminal device to:
determine an uplink precoder for the relative uplink channel.

21. The terminal device according to claim 19, further comprising a non-transitory storage medium storing a set of operations, and wherein the processing circuitry is configured to retrieve said set of operations from the storage medium to cause the terminal device to perform said set of operations.

22. A terminal device for estimating a relative uplink channel between a terminal device and a network node, the terminal device comprising:
a processor coupled to a memory comprising executable instructions that when executed by the processor cause the processor to operate to:
transmit reference signals from at least two antennas on respective uplink channels towards a network node;
receive a forwarded representation of each of the reference signals from the network node;
determine estimations of the respective uplink channels towards the network node for the at least two antennas using the reference signals and the received forwarded representations of the reference signals;
determine a computational relationship between the estimations of the respective uplink channels by dividing between the estimations of the respective uplink channels; and
estimate the relative uplink channel based on the determined computational relationship, wherein the relative uplink channel represents an uplink radio propagation environment, towards the network node, between the at least two antennas.

23. The terminal device according to claim 22, wherein the memory comprises executable instructions that when executed by processor further cause the processor to operate to:
determine an uplink precoder for the relative uplink channel.

24. A computer program product for estimating a relative uplink channel between a terminal device and a network node, the computer program product comprising a non-transitory computer readable medium storing computer code which, when run on processing circuitry of a terminal device, causes the terminal device to:
transmit reference signals from at least two antennas on respective uplink channels towards a network node;
receive a forwarded representation of each of the reference signals from the network node;
determine estimations of the respective uplink channels towards the network node for the at least two antennas using the reference signals and the received forwarded representations of the reference signals;
determine a computational relationship between the estimations of the respective uplink channels by dividing between the estimations of the respective uplink channels; and
estimate the relative uplink channel based on the determined computational relationship, wherein the relative uplink channel represents an uplink radio propagation environment, towards the network node, between the at least two antennas.

* * * * *